(12) United States Patent
Aghvami et al.

(10) Patent No.: US 7,609,613 B2
(45) Date of Patent: Oct. 27, 2009

(54) CYCLIC DELAY DIVERSITY AND SPACE CODED-HYBRID DIVERSITY TRANSMITTER

(75) Inventors: Abdol Hamid Aghvami, London (GB);
Mischa Dohler, Meylan Cedex (FR);
Fatin Said, London (GB); Afzal Mahmood Lodhi, Middlesex (GB);
Francesco Saverio Ostuni, London (GB)

(73) Assignee: King's College London of The Strand, London (GB)

( * ) Notice: Subject to any disclaimer, the term of this patent is extended or adjusted under 35 U.S.C. 154(b) by 407 days.

(21) Appl. No.: 11/363,430

(22) Filed: Feb. 27, 2006

(65) Prior Publication Data

US 2006/0193245 A1 Aug. 31, 2006

(30) Foreign Application Priority Data

Feb. 28, 2005 (GB) .................................. 0504061.3

(51) Int. Cl.
*H04J 1/16* (2006.01)
(52) U.S. Cl. ...................................... 370/208; 370/229
(58) Field of Classification Search ................. 375/259, 375/260, 267; 370/229, 235
See application file for complete search history.

(56) References Cited

U.S. PATENT DOCUMENTS

| 6,842,487 B1 * | 1/2005 | Larsson ....................... 375/260 |
| 2006/0068698 A1 * | 3/2006 | Sandhu et al. .................. 455/1 |

FOREIGN PATENT DOCUMENTS

GB 2 392 584 A 3/2004

OTHER PUBLICATIONS

Bölcskei, Helmut, et al., "Space-Frequency Coded Broadband OFDM Systems," IEEE WCNC 2000, Chicago IL, Sep. 23-28, 2000, pp. 1-6.
Alamouti, Siavash M., "A Simple Transmit Diversity Technique for Wireless Communications," IEEE Journal on Select Areas in Communications, vol. 16, No. 8, Oct. 1998, pp. 1451-1458.

(Continued)

*Primary Examiner*—Chi H Pham
*Assistant Examiner*—Fan Ng
(74) *Attorney, Agent, or Firm*—Kelley Drye & Warren LLP

(57) ABSTRACT

A diversity transmitter for use in an OFDM transmission protocol which diversity transmitter comprises:

a diversity generator (2) for receiving and diversifying OFDM transmit symbols, and outputting diversified OFDM symbol matrices (DOSM), DOSM symbols within each DOSM being divided into at least two primary streams each comprising different DOSM symbols, a transmit processor for receiving said at least two primary streams of DOSM symbols, and for transforming said each DOSM symbol from the frequency domain into the time domain, and outputting time domain OFDM symbols (TDOSs), a cyclic delay circuit (41 ... 4P) for dividing at least one of said primary streams of TDOSs into at least two branches of identical TDOSs, each branch for supplying a respective spatial channel for transmission to a receiver, the arrangement being such that, in use, said cyclic delay circuit (41 ... 4P) applies a cyclic time shift to a TDOS symbol in at least one of said branches before transmission.

25 Claims, 8 Drawing Sheets

OTHER PUBLICATIONS

Tarokh, Vahid, et al., "Space—Time Block Codes from Orthogonal Designs," IEEE Transactions on Information Theory, vol. 45, No. 5, Jul. 1999, pp. 1456-1467.

Tarokh, Vahid, et al., "Space—Time Codes for High Data Rate Wireless Communication: Performance Criterion and Code Construction," IEEE Transactions on Information Theory, vol. 44, No. 2, Mar. 1998, pp. 744-765.

Dammann, Armin, et al., "Standard Conformable Antenna Diversity Techniques for OFDM and its Application to the DVB-T System," IEEE Global Telecommunications Conference (GLOBECOM 2001), Nov. 2001, pp. 3100-3105.

Bölcskei, Helmut, et al., "Space—Frequency Coded MIMO-OFDM with Variable Multiplexing— Diversity Tradeoff," International Conference on Commun. (ICC), May 2003, pp. 2837-2841.

Xin, Yan, et al., "Space—Time Diversity Systems Based on Linear Constellation Precoding," IEEE Transactions on Wireless Communications, vol. 2, No. 2, Mar. 2003, pp. 294-309.

Ma, Xiaoli, et al., "Space—Time—Multipath Coding Using Digital Phase Sweeping or Circular Delay Diversity," IEEE Transactions on Signal Processing, 2004, pp. 1-10.

Su, Weifeng, et al., "Obtaining Full—Diversity Space—Frequency Codes from Space—Time Codes via Mapping," IEEE Transactions on Signal Processing, vol. 51, No. 11, Nov. 2003, pp. 2905-2916.

European Telecommunications Standards Institute (ETSI) TS 101 475 V1.1.1 Technical Specification, Broadband Radio Access Networks (BRAN); HIPERLAN Type 2; Physical (PHY) layer, Apr. 2000, pp. 1-40.

Jakes, W. C., et al., "Microwave Communications," Wiley, 1974, pp. 64-75.

* cited by examiner

CYCLIC DELAY DIVERSITY AND SPACE CODED-HYBRID DIVERSITY TRANSMITTER

CROSS REFERENCE TO RELATED APPLICATIONS

Priority is claimed from UK Patent Application No. 0504061.3 filed Feb. 28 2005 under 35 USC 119, the disclosure of which is incorporated herein in its entirety by reference.

All references cited in the specification, and their references, are incorporated by reference herein in their entirety where appropriate for teachings of additional or alternative details, features and/or technical background.

US GOVERNMENT RIGHTS

Not applicable.

FIELD OF THE INVENTION

The present invention relates to a diversity transmitter, to a base station, a mobile radio communication device and a broadcast transmitter each comprising such a diversity transmitter; and to a method of transmitting data in an OFDM system.

BACKGROUND TO THE INVENTION

Orthogonal frequency division multiplexing (OFDM) based systems are the most promising candidates for 4th generation broadband mobile communication networks. Such systems deployed with multiple-input multiple-output (MIMO) techniques promise satisfaction of the ever growing demands of multi-media services and applications. OFDM has been successfully used in standards for digital audio broadcasting (DAB), terrestrial digital video broadcasting (DVB-T), and wireless local area networks (WLANs), for example. It reduces receiver complexity in the equalization and symbol decoding stages by transmitting each symbol over a single flat sub-channel. However, OFDM's inability to extract multipath diversity (inherently present in the broadband wireless channel) and to guarantee symbol detection, when channel nulls occur on parallel sub-channels, are two adverse effects associated with its simplicity.

Diversity techniques are proven to be very effective for combating time varying multipath fading in broadband wireless channel environments. In these techniques, some less attenuated replicas of the transmitted signal, either in the time, frequency or spatial domain, or a combination of all three, are provided to the receiver. These replicas minimize the degrading channel imperfections and enhance the system performance. Temporal diversity is widely achieved by using forward error correction (FEC) coding in combination with (random) time interleaving, whereas frequency diversity can be exploited by using non-linear equalizers or Rake receivers in a single carrier system or with a FEC in an OFDM based system. Spatial diversity in the form of spatially separated, cell sectoring, or polarized antennas have also been of major interest in the research community. All of the above mentioned diversity methods are severely dependent on channel scenarios, transmission data rate, Doppler spread and channel delay spread. Therefore, it is very difficult to realize all forms of diversity in one particular system; for example, in case of slow fading channels with large delay spreads, random time interleaving with FEC or channel coding becomes ineffective. Similarly, frequency interleaving becomes useless for channel environments showing a typical frequency-flat profile. In contrast, spatial diversity is the best approach towards mitigating the channel impairments and enhancing performance, as long as signals at the transmit and receive antenna elements are sufficiently de-correlated.

In connection with diversity transmitters, different concepts are being discussed for multi-carrier, in particular OFDM systems. OFDM is ideally suited for broadband frequency selective channels as it gives the opportunity to use the existing transmit diversity techniques (designed for flat fading channels) in such environments. The design and performance criteria for broadband MIMO OFDM systems promises an excellent diversity level, which is multiplicative of transmit and receive antennas, and the number of multipath components of the broadband channel (with an ideal assumption like equal power in all multipath components and fixed delay between them) [1]. However, the orthogonal space-time block code (STBC) processing scheme proposed in [2] and generalized in [3] failed to extract any or almost no multipath diversity in OFDM. Space-time trellis codes (STTC) of [4], promise diversity as well as coding gain but become unattractive due to their complexity in practical realizations. Other transmit diversity techniques like non-orthogonal block codes also faced the same dilemma of lack of frequency or multipath diversity. This gave a research challenge to design new set of codes for OFDM based systems that would extract at least some of the promised advantages of MIMO OFDM.

Nevertheless, some transmitter diversity schemes, in particular Delay Diversity (DD), when modified to be used in OFDM systems gives excellent simplicity and performance. This technique can be found in many forms, where it differs slightly in terms of its placement in the system. Cyclic Delay Diversity (CDD) (a time domain equivalent of Phase Diversity (PD)) is an improved version of DD. In particular, CDD addresses the adverse effects of DD by introducing cyclic time delays instead of simply time delays [5]. For OFDM based systems, CDD is the simplest approach for extracting frequency diversity that itself has no built-in diversity. It converts the spatial diversity into frequency diversity by artificially increasing the channel delay spread. However, it requires an outer channel or a FEC facility to benefit from the induced selectivity.

Over the years, the search for optimal transmit diversity schemes for MIMO OFDM systems led to many transmitter diversity processing structures and configurations. All these proposed schemes tackled the problem of achieving the maximum (spatial plus multipath) diversity and coding gain in frequency selective environments. By trading complexity, additional processing and incorporating pre-coding arrangements, it was shown that theoretical diversity limits could be achieved. The most noticeable diversity transmitters in this regard can be found in [6], [7], [8] and [9].

In [6], a MIMO-OFDM scheme with variable multiplexing gains was presented. This scheme traded data rate for full diversity (spatial and multipath) by employing an arbitrary space-time code (STC), and to achieve maximum spatial diversity OFDM sub-carriers were encoded. On top of this, an outer codec was used for achieving multipath diversity. The amount of frequency diversity is related to the redundancy introduced by this outer codec, making this scheme severely dependent on the outer codec and the number of resolvable multi-paths. Only a fraction of the available frequency diversity could be exploited when considering an affordable rate loss and practical scenarios.

In [7] and [8], linear constellation pre-coding (LCP) based OFDM diversity transmitters were presented. The design of LCP with STC techniques was discussed in [7]. This approach used existing STCs of [3] and [4], and relied on combining these codes with redundant or non-redundant precoders. This scheme achieved maximum diversity and coding gain at the expense of spectral efficiency. Another LCP based diversity transmitter was presented in [8]. This scheme did not rely on STC techniques and used digital phase sweeping (DPS) or circular block delay diversity (CBDD), which are the same as CDD or PD. To achieve the full diversity, this scheme was again dependent on the LCP. The design of this LCP has severe implications on realistic channel conditions and restricted the number of diversity braches.

The scheme in [9] used a mapping approach to design full diversity codes from the existing STC techniques for arbitrary power delay profiles, again suffering from severe rate loss for attaining maximum diversity.

Drawbacks of aforementioned techniques include loss of data rate and/or additional transmitter and receiver complexities. Incorporating LCP or some other codecs to extract multipath diversity may not be the best solution. In all wireless and mobile communication systems channel or FEC coding techniques have become an integral part. These techniques can provide a much simpler and cost effective solution in extracting the frequency diversity in broadband scenarios. We have realised that a hybrid of STC schemes and CDD may offer an improved diversity transmitter and method measured in terms of performance, cost and complexity for multi-carrier systems.

WO 03/015334 (Hottinen) discloses a diversity transmitter for use in CDMA systems. The transmitter applies fixed complex weights in the frequency domain to symbols to be transmitted. Hottinen's scheme is not suitable for use in systems that employ OFDM for broadband, as it requires additional processing at the transmitter. Hottinen's scheme would require significant modification to be useful in OFDM systems.

SUMMARY OF THE INVENTION

Preferred embodiments of the present invention are based on the insight that in a broadband multi-carrier system it is possible to improve performance by utilising diversity coding techniques to extract spatial diversity, and at the same time to use cyclic time delays to improve frequency diversity in the broadband channel.

It is an aim of at least preferred embodiments of the present invention to provide an improved and less complex diversity transmitter and a transmission method for OFDM based systems, in which the drawbacks of complexity and spectral efficiency are mitigated.

According to the present invention there is provided a diversity transmitter for use in an OFDM transmission protocol which diversity transmitter comprises:

a diversity generator for receiving and diversifying OFDM transmit symbols, and outputting diversified OFDM symbol matrices (DOSM), DOSM symbols within each DOSM being divided into at least two primary streams each comprising different DOSM symbols;

a transmit processor for receiving said at least two primary streams of DOSM symbols, and for transforming said each DOSM symbol from the frequency domain into the time domain, and outputting time domain OFDM symbols (TDOSs); and a cyclic delay circuit for dividing at least one of said primary streams of TDOSs into at least two branches of identical TDOSs, each branch for supplying a respective spatial channel for transmission to a receiver;

the arrangement being such that, in use, said cyclic delay circuit applies a cyclic time shift to a TDOS in at least one of said branches before transmission. The diversity transmitter may be implemented entirely in software or hardware, or a combination of both. One particular advantage of the present invention is that channel selectivity is improved; more frequency selective channels help the receiver to extract multipath diversity gain in conjunction with channel coding (although with Trellis codes for example channel coding is not mandatory to achieve this advantage). Furthermore the use of additional antenna branches to transmit cyclically delayed replicas of symbols output from the diversity generator does not incur a rate loss. Still further the additional branches of the transmitter do not require any changes at the receiver other than channel estimation to cater for longer impulse responses that are artificially created by the cyclic time shift. Thus the diversity transmitter is very simple to implement. The diversity transmitter can form part of a MISO (multiple input single output) and/or MIMO link.

It will be appreciated that the number of branches in a cyclic delay circuit can be varied (and be different between cyclic delay circuits) according to the channel characteristics where the transmitter is to be used. For example, increasing the number of branches (i.e. the number of cyclic time shifted symbol replicas) can help to make the wideband channel more frequency selective at the carrier frequencies of the OFDM system. For wideband channels that are already highly frequency selective, the use of one or two extra branches enables similar performance with fewer total spatial channels than diversity transmitters that use only space-time coding for example.

Thus the diversity transmitter is very simple whilst achieving good spectral efficiency. Further features are set out in claims 2 to 16 to which attention is hereby directed.

According to another aspect of the present invention there is provided a method of transmitting data in an OFDM system, which method comprises the steps of:

(1) using a diversity generator to receive and diversify OFDM transmit symbols, and output diversified OFDM symbol matrices (DOSM);

(2) dividing DOSM symbols within each DOSM into at least two primary streams each comprising different DOSM symbols;

(3) transforming each DOSM symbol from the frequency domain into the time domain, and outputting time domain OFDM symbols (TDOSs);

(4) dividing at least one of said primary streams of TDOSs into at least two branches of identical TDOSs, each branch for supplying a respective spatial channel for transmission to a receiver; and (5) applying a cyclic time shift to a TDOS in at least one of said branches before transmission.

Further steps of the method are set out in claims 18 to 29 to which attention is hereby directed.

A diversity transmitter and method according to the invention may bring about some of the following advantages: improvement of performance without any additional complexity at the receiver; increased frequency selectivity for low selective and low delay spread channels; conversion of spatial diversity into frequency diversity assisted by channel coding; spectral efficiency is dependent only on the diversity generator; simple implementation of cyclic time shifts (performance of the cyclic time shift in the time domain eases computational overhead for example); cyclic time shift can be set according to the system guard period; any diversity generator can be used, although full rate STBC are preferred for greater spectral efficiency.

According to another aspect of the present invention there is provided a computer program product storing computer executable instructions for performing the method set out above. The computer program product may be, for example, embodied on a record medium, in a computer memory, in a read-only memory.

There is also provided a diversity transmitter and a transmission method in which there is first channel coding, e.g. by a Turbo/Convolutional codes, the output is modulated, e.g. phase shift keying, the modulated output is subjected to diversification for example STBC, serial to parallel converted, OFDM processed (e.g. inverse fast Fourier transform or inverse discrete fast Fourier transform), parallel to serial converted, each or at least one of the diversified output is subjected to a plurality of at least two branches, in each or at least one branch the symbol sequence is subjected to a cyclic time shift with in each symbol and then transmitted from the parallel spatial channels after insertion of guard period in each branch.

Thus by virtue of the present invention the drawbacks in terms of rate and complexity inherent to known prior art arrangements may be reduced.

BRIEF DESCRIPTION OF THE DRAWINGS

For a better understanding of how the invention may be put into practice, preferred embodiments of the invention will be described, by way of example only, to the accompanying drawings, in which.

DETAILED DESCRIPTION OF THE PREFERRED EMBODIMENTS

Figure 1:
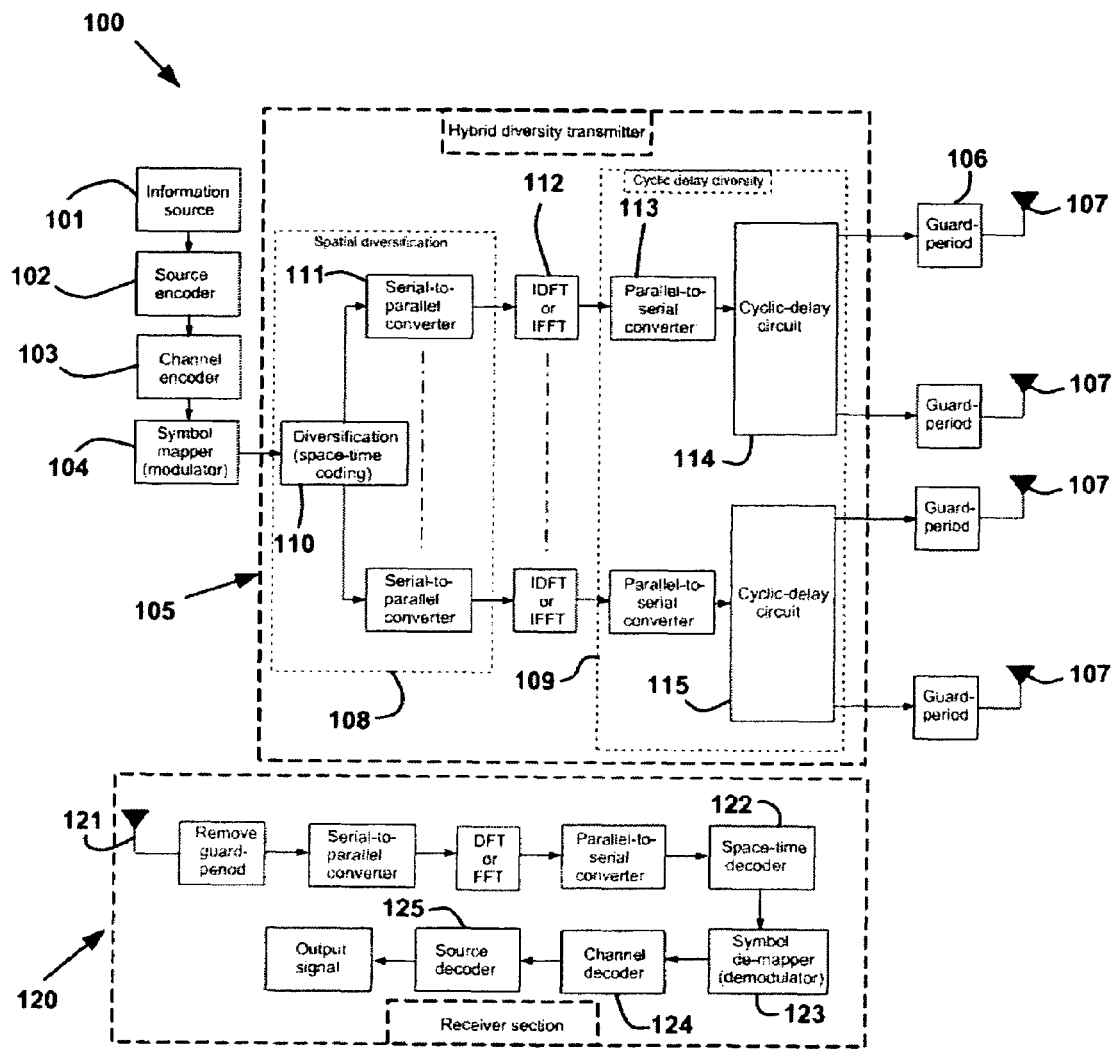
FIG. 1 is a block diagram of an OFDM wireless communication system employing a diversity transmitter according to the present invention.

Referring to FIG. 1 a functional block diagram generally identified by reference numeral 100 shows the basic elements of an OFDM based wireless digital communication system equipped with a diversity transmitter according to the present invention. An information source 101 provides an output that may be either any analog signal, such as audio or video signal, or any digital signal, such as the output of a compact disc player, that is discrete in time and has a finite number of characters. A source encoder 102 converts the output (or "messages") from the information source 101 into a sequence of binary digits. Ideally, the information source 101 output is represented by as few binary digits as possible. In other words, an efficient representation of the source output that results in little or no redundancy. The process of efficiently converting the output of either an analog or digital source into a sequence of binary digits is called source encoding or data compression.

The sequence of binary digits from the source encoder is passed to a channel encoder 103 that introduces, in a controlled manner, some redundancy in the binary information sequence that can be used at the receiver to overcome the effects of noise and interference encountered in the transmission of the signal through the channel. Thus the added redundancy serves to increase the reliability of the received data and improves the fidelity of the received signal.

The binary sequence at the output of the channel encoder 103 is passed to a symbol mapper 104 (also known as a digital modulator). Since nearly all of the communication channels encountered in the practice are capable of transmitting electrical signals or waveforms, the primary purpose of the digital modulator is to map the binary information sequence into signal waveforms.

The mapped bits or symbols are then sent for diversification in a diversity generator 105 which generates OFDM symbols for transmission. Following that a guard period 106 is added to each OFDM symbol to reduce intersymbol interference (ISI). Finally each OFDM symbol is transmitted from a respective antenna 107.

When multiple transmit antennas (i.e. at least two) are used for the purpose of achieving spatial diversity, then the combination of the diversity generator 105 and the multiple antennas 107 can be called a diversity transmitter. The hardware for implementing a diversity transmitter comprises: a baseband processing unit with outputs for each antenna; at least one amplifier before and/or after up-conversion for each antenna; one or more RF up-conversion block (usually performed in steps with several blocks); and at least two antennas. The baseband processing unit comprises: ROM storing data processing algorithms (described in greater detail below) for processing the incoming symbol stream from the symbol mapper 104; RAM for buffering the incoming symbol stream; Application Specific Integrated Circuits (ASICs) and/or Digital Signal Processors (DSPs); and data buses for handling movement of data through the baseband processing unit. The incoming symbol stream is processed and handled at a symbol level by the ASICs and/or DSPs, as well as the ROM, RAM and data buses.

Functionally, the diversity generator 105 comprises a spatial diversifier 108 and a cyclic delay diversifier 109. The spatial diversifier 108 comprises a diversifier 110 that implements space time coding and produces multiple outputs depending on the type of block or trellis coding used. Each output is subjected to multi-carrier (MC) modulation (also known as OFDM processing) by a transmit processor comprising three blocks: serial to parallel converter 111, IFFT 112 and parallel to serial converter 113 to generate ODFM symbols. The transmit processor is, in a functional sense, between the spatial diversifier 108 and the cyclic delay diversifier 109; physically the transmit processor may form part of the aforementioned baseband processing unit. The principle of multi-carrier modulation is to map a serial high rate source stream onto multiple parallel low rate substreams and to modulate each substream on another subcarrier. Since the symbol rate on each subcarrier is much less than the serial source symbol rate, the effects of delay spread significantly decrease, reducing the complexity of the equalizer. OFDM is a relatively simple technique to bandwidth-efficiently modulate multiple subcarriers by using the digital signal processing as IFFT or IDFT on the transmit side and FFT or DFT at the receiver side. One of the main design goals for an MC transmission scheme based on OFDM in a mobile radio channel is that the channel can be considered as time-invariant during one OFDM symbol and that the fading per subcarrier can be considered as flat. Thus, the OFDM symbol duration should be smaller than the coherence time of the channel, and the subcarrier spacing should be smaller than the coherence bandwidth of the channel. By fulfilling these conditions, the realization of relatively simple receivers is possible.

After the OFDM processing each OFDM symbol is replicated on multiple branches for cyclic delay processing by cyclic delay circuits 114, 115. Each cyclic delay circuit 114, 115 comprises at least two branches, OFDM symbols in one or more branch being cyclically rotated (i.e. applies a cyclic time shift) in a controlled manner as more fully described below. The functionality of the cyclic delay circuits 114 may be implemented in the digital baseband domain using one or more Field Programmable Gate Array (FPGA) in the baseband processing unit. Finally, a guard period is added to each cyclically rotated OFDM symbol to mitigate inter symbol interference (ISI) and the signals are transmitted from the antennas 107.

A receiver 120 receives the signals via an antenna 121. The receiver 120 processes the received signals in a reverse manner, starting with guard period removal, serial to parallel conversion, FFT processing, back to serial and finally fed to decoders. First a space time decoder 122, then a demodulator 123 processes the channel corrupted signal and reduces the waveforms to a sequence of numbers that represent estimates of the transmitted data symbols. The sequence of numbers is passed to a channel decoder 124, which attempts to reconstruct the original information sequence from knowledge of the code used by the channel encoder and the redundancy contained in the received data. A measure of how well the demodulator 123 and channel decoder 124 perform is the frequency with which the errors occur in the decoded sequence. More precisely, the average probability of bit-error at the output of the channel decoder 124 is a measure of the performance of the demodulator-decoder combination. In general the probability of error is a function of code characteristics, the types of waveform used, the diversification employed (space-time block or trellis and combination of cyclic delay diversity), the transmit power, the wireless channel, the noise at receiver, the nature of interference, number of transmit and receive antennas, etc., and the method of demodulation and decoding.

Finally, for an analog output, a source decoder 125 accepts the output sequence from the channel decoder 124 and from the knowledge of source encoding method used, attempts to reconstruct the original signal from the information source 101.

In the diversity transmitter and method according to the present invention there are multiple parallel transmissions out of at least three spatial channels (which may be antennas or beams) and preferably four or more. Out of the at least three parallel channels at least one of the said spatial channel is shifted by a cyclic shift, the cyclic shift being a fraction/multiple of the system guard period. There may be at least three (logical) parallel channels at a given receiver, although the invention does not place any structural requirements on the receiver.

Figure 2:
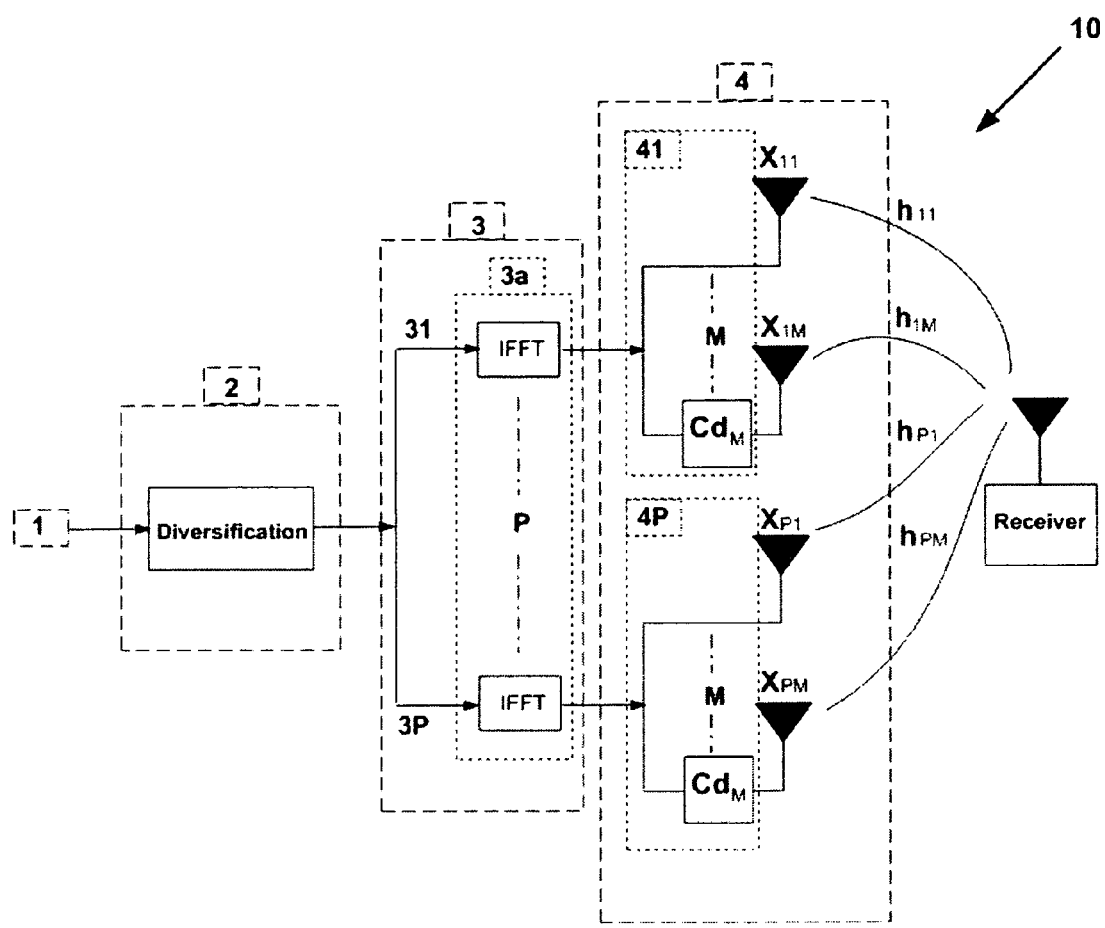
FIG. 2 is a block diagram of a first embodiment of a diversity transmitter in accordance with the present invention.

FIG. 2 shows a generic block diagram of the diversity transmitter. Transmissions out of antennas (representing an example of spatial channels) $X_{11}$, L, $X_{1M}$, L, $X_{P1}$, L, $X_{PM}$ are experiencing the influence of respective transmission channels $h_{11}$, L, $h_{1M}$, L, $h_{P1}$, L, $h_{PM}$ before reception at a receiver. In general, an OFDM symbol sequence/vector/matrix s to be transmitted is processed at the transmitter, transmitted via the transmission channels and received at the receiver, where it is subjected to reception processing in order to reconstruct the initially transmitted signal. Reception processing involves channel estimation in order to compensate for the influence of the transmission channels. (Note that the symbol s as well as the transmission channels, i.e. channel impulse response a thereof, are in matrix notation).

Referring to FIG. 2, a diversity transmitter generally identified by reference numeral 10 comprises a transmit symbol input 1 for inputting OFDM transmit symbols (symbol matrix or a sequence of symbols) into a diversity generator 2. The transmit symbol input 1 is the output from a channel encoder and symbol mapper (modulator) in the form of a channel coded sequence. The channel coded sequence may be generated by Turbo coding, convolutional coding, block coding, or Trellis coding for example, and the symbol mapper may employ phase shift keying or quadrature amplitude modulation for example. The diversity generator 2 facilitates diversity using orthogonal transmit diversity (OTD) or any other diversity mechanism by applying a generator (e.g. a generator matrix) to each OFDM transmit symbol sequence/matrix and outputs a stream of diversified OFDM symbols s each of size N where N is the number of sub-carrier frequencies in the OFDM system. The stream of diversified OFDM symbols is supplied to a transmit processor 3a where the stream is divided into P primary streams. As shown in the FIG. 1, first diversified OFDM symbol $s_1$ is supplied to a transmit processor 31, while the pth diversified signal $s_P$ is supplied to a transmit processor 3P. The processor 3a converts each OFDM symbol from the frequency domain into the time domain by inverse fast Fourier transform or inverse discrete Fourier transform i.e. OFDM processing, and outputs P time domain OFDM symbols. Each of the P primary streams is input to a respective cyclic delay circuit 41 . . . 4P. Each cyclic delay circuit 41 . . . 4P comprises M branches, each branch having a copy of the respective time domain OFDM symbol output by the transmit processor 3a. Furthermore each branch m comprises a respective transmit antenna $X_{11}$, L, $X_{1M}$, L, $X_{P1}$, L, $X_{PM}$. In use each cyclic delay circuit 41 . . . 4P applies a cyclic time shift to some of the time domain OFDM symbols using a cyclic delay matrix $Cd_m$. The cyclic delay matrix $Cd_m$ effects a shift of $\delta cy_m$ samples of the time domain OFDM symbol modulo the total number of samples in a time domain OFDM symbol. The effect of this cyclic time shift is to increase the overall delay spread of the channel, at the receiver, as explained in greater detail below.

Each cyclic delay circuit 41 . . . 4P applies a cyclic time shift to one or more copies of the time domain OFDM symbol s on its M branches. For example the cyclic delay circuit 41 of FIG. 1 receives symbol x on both branches. The upper branch applies $\delta cy_m=0$ (i.e. no time delay), whereas the lower branches applies $\delta cy_m$. This generates two output OFDM symbols: $x_{11}$ to be transmitted from antenna $X_{11}$ and $x_{12}$ to be transmitted from antenna $X_{12}$. The same procedure takes place at the other cyclic delay circuits 42 . . . 4P on the other time domain OFDM symbols. After this processing and addition of the usual guard period (or cyclic prefix) all OFDM symbols are transmitted substantially simultaneously from the antennas $X_{11}, L, X_{1M}, L, X_{P1}, L, X_{PM}$. It will appear to the receiver that the signal comes from only P antennas, each with longer channel impulse responses, despite the fact that PM antennas have been used for transmission. To extract this multipath diversity reliance is placed on channel coding techniques (e.g. convolutional codes), already part of many system standards. If a STTC encoder is used as the diversity generator 2, reliance on channel coding to extract the multipath gain is not necessary.

The cyclic delay matrix $Cd_m$ takes the form:

$$Cd_m = \begin{bmatrix} 0 & I_{(m-1)(L+1)} \\ I_{N-(m-1)(L+1)} & 0 \end{bmatrix}, m \in [1, M]$$

where $I_A$ is the identity matrix of order A×A, N is the number of sub-carrier frequencies in the OFDM system, M is the total number of branches in the cyclic delay circuit 41 . . . 4P where $Cd_m$ is to be applied, and (L+1) is number of non-zero taps assumed in the channel transfer function. The transmitted OFDM symbols from different antennas are cyclically delayed replicas of each time domain OFDM symbol. Furthermore the construction of the cyclic delay matrix $Cd_m$ ensures that the delay applied to each OFDM symbol on the first antenna of each stream p is zero i.e. the original diversity encoded OFDM symbol is transmitted. Cyclically delayed versions are transmitted from the other antennas at the same time.

In FIG. 2 each cyclic delay circuit 41 . . . 4P is identical to the others and cyclic delay matrix $Cd_m$ effects only the lower branches (M≧2) in each circuit. Each cyclic delay circuit 41 . . . 4P can have differing numbers of branches. Alternatively, cyclic delay matrix $Cd_m$ may be used in the upper branch instead of the lower branch or in any number of branches. The symbols sequence/matrix s needs to be defined differently depending upon the diversity generator used. This will be explained in greater detail with reference to FIG. 3.

Figure 3:
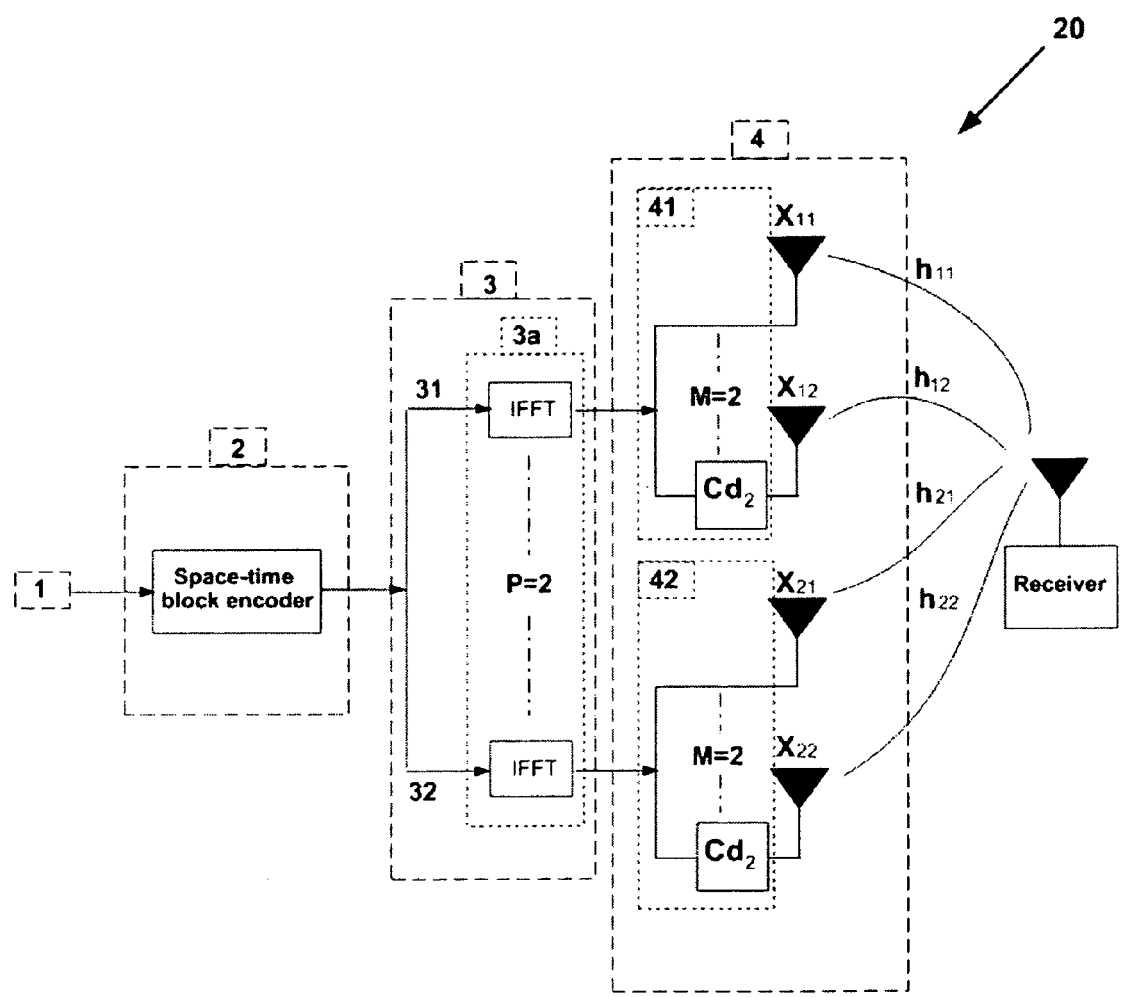
FIG. 3 is a block diagram of a second embodiment of a diversity transmitter in accordance with the present invention.

Referring to FIG. 3 a diversity transmitter generally identified by reference numeral 20 comprises four spatial channels $X_{11}, X_{12}, X_{21}, X_{22}$ i.e. both P, M=2 (transmit antennas) with the transmit symbol input 1 and the diversity generator 2 generally similar to those described in connection with FIG. 1. The diversity generator 2 is a full rate space-time block encoder such as that described in [2]. A first diversified OFDM symbol $s_1$ is supplied to a transmit processor 31, while a second diversified OFDM symbol $s_2$ is supplied to a transmit processor 32. As the symbols $s_1$ and $s_2$ belong to the space-time block code matrix, they become $s_1=(c_1 c_2)$ and $s_2=(-c_2^* c_1^*)$ (or any combination of two OFDM symbols with orthogonal structure), where $c_1$ and $c_2$ are complex OFDM symbols and c* represents the complex conjugate of symbol c. The complex OFDM symbols are separable (in fact orthogonal) due to the properties of space-time block codes. Note that in this case the symbol rate remains at 1 since it takes two time intervals to transmit two symbols due to the properties of STBC. However, the diversity order is doubled.

When considering diversification with some other technique for example, STTC one needs to define the symbols s differently depending upon the memory order of the trellis encoder (see [4] for example).

Next the transmit processor 3a converts the OFDM symbols streams $s_1$ and $s_2$ from the frequency domain to the time domain ('OFDM processing') e.g. using an IFFT, and outputs two time domain OFDM symbols: $c_1$ followed by $-c_2^*$ on stream p=1, and $c_2$ followed by $c_1^*$ on stream p=2. Following this the time domain OFDM symbols in each stream are forwarded to respective cyclic delay circuits 41, 42, where they are processed by the cyclic delay matrices $Cd_m$ as follows. At time t=0, symbol $c_1$ is given a cyclic shift of $\delta cy_1=0$ on branch m=1, and a cyclic shift of $\delta cy_2=16$ samples on branch m=2 of the cyclic delay circuit 41. At the same time symbol $c_2$ is given a cyclic shift of $\delta cy_1=0$ on branch m=1, and a cyclic shift of $\delta cy_2=16$ samples (assuming the guard period of the considered OFDM system is 16 samples) on branch m=2 of the cyclic delay circuit 42. At time t=1, symbol $-c_2^*$; is given a cyclic shift of $\delta cy_1=0$ on branch m=1, and a cyclic shift of $\delta cy_2=16$ samples on branch m=2 of the cyclic delay circuit 41. At the same time symbol $c_1^*$ is given a cyclic shift of $\delta cy_1=0$ on branch m=1, and a cyclic shift of $\delta cy_2=16$ samples on branch m=2 of the cyclic delay circuit 42. This results in the following symbols being transmitted from the diversity transmitter 20 at times t=0 and t=1:

|  | X11 | X12 | X21 | X22 |
|---|---|---|---|---|
| t = 0 | $c_1$ | $c_1 \cdot \delta cy_2$ | $c_2$ | $c_2 \cdot \delta cy_2$ |
| t = 1 | $-c_2^*$ | $-c_2^* \cdot \delta cy_2$ | $c_1^*$ | $c_1^* \cdot \delta cy_2$ |

The choice of cyclic time shift is purely dependent on the channel memory (number of resolvable multipath components or taps). As the channel memory is assumed not known at the diversity transmitter, it can be compensated with the guard period of the OFDM system. The guard period (or cyclic prefix) is used in OFDM systems to compensate for the delay spread of the channel and helps to reduce intersymbol interference (ISI). Thus the magnitude of the cyclic time shift (or delay) may be chosen as a function of the guard period. For example in the Hiperlan II standards the number of OFDM sub-carriers is 64 and a compulsory guard period of 16 samples is prescribed. When considering the diversity transmitter of FIG. 2 for Hiperlan II standards the cyclic delay matrices $Cd_2$ should shift each OFDM symbol in the lower branch m=2 by 16 samples; the cyclic shift neither increases the length of the subject OFDM symbol nor increases compulsory guard period of the system. The cyclic shift effects a shift of the OFDM symbol in the time domain that appears to the receiver as a multipath component (and therefore useable to obtain a diversity gain).

When considering more than two branches in each cyclic delay circuit 41 . . . 4P, the cyclic delays are chosen as multiple of guard period on successive parallel branches. This will be explained with reference to FIG. 4.

Figure 4:
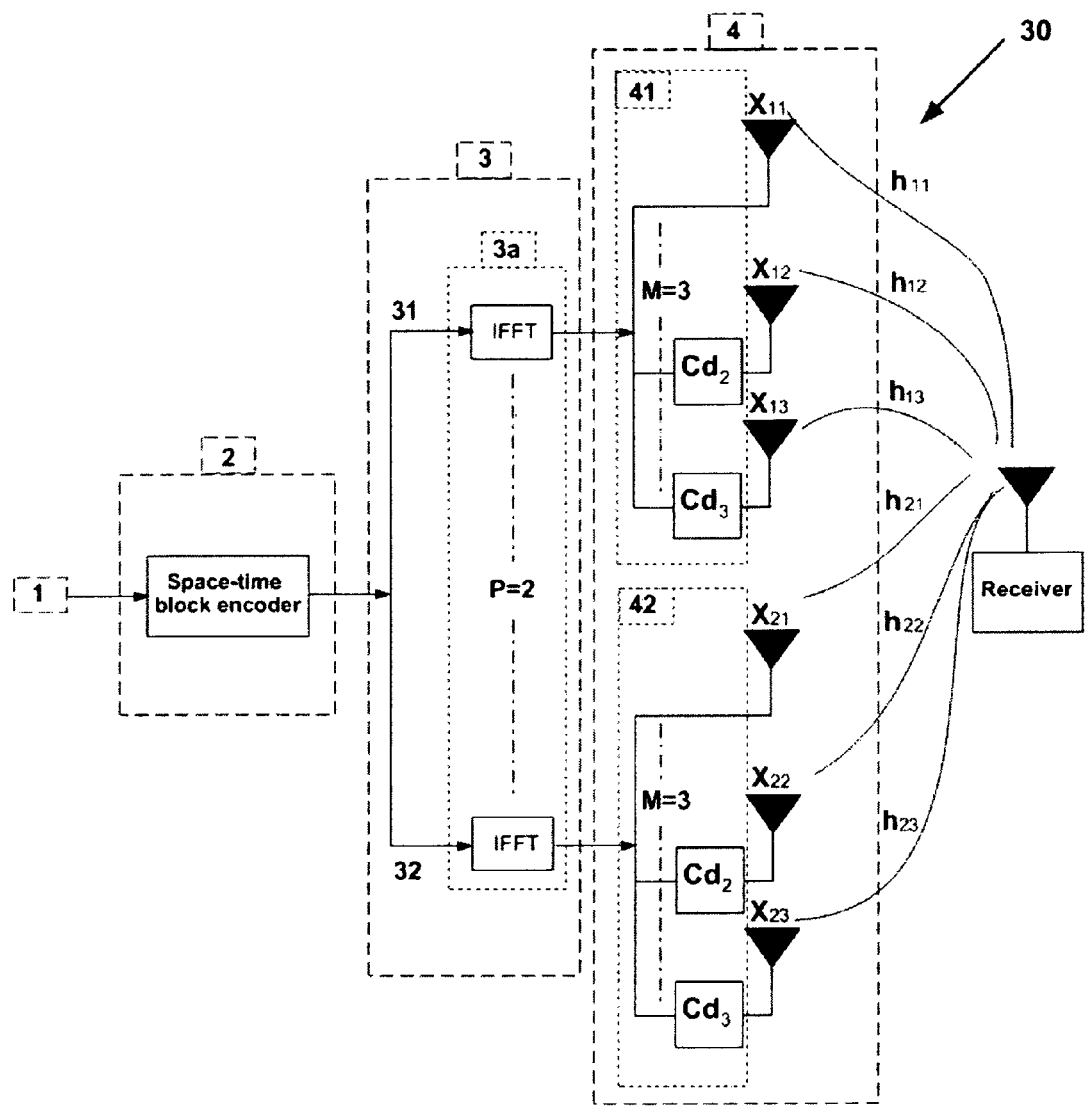
FIG. 4 is a block diagram of a third embodiment of diversity transmitter in accordance with the present invention.

Referring to FIG. 4 a diversity transmitter generally identified by reference numeral 30 generally similar to the diversity transmitter 10, comprises six spatial channels $X_{11}, X_{12}, X_{13}, X_{21}, X_{22}, X_{23}$ with a full rate STBC as the diversity generator 2. The diversity generator 2 generates P=2 diversified OFDM symbol streams each of which is input to a cyclic delay circuit 41 and 42 respectively. Each cyclic delay circuit 41, 42 comprises M=3 branches and thus there are six spatial channels in total.

In each cyclic delay circuit 41, 42 the time domain OFDM symbols are operated on by a respective cyclic delay matrix $Cd_m$. The cyclic delay matrices $Cd_m$ in each cyclic delay circuit 41, 42 cyclically shift each time domain OFDM symbol by a different number of samples. The difference between cyclic time shift(s) in each branch of cyclic delay circuits 41, 42 is a maximum by which is meant that the shift in samples should be such that the symbols transmitted from the different spatial channels should not overlap, whereby the receiver sees longer impulse responses coming from the respective primary stream p, no matter how many branches there are in the corresponding cyclic delay circuit. This can be achieved by choosing the cyclic time shift (in samples) as different multiples of the system guard period in successive branches in each cyclic delay circuit 41, 42.

Taking the Hiperlan II example, the cyclic shift in each of upper branch of each cyclic delay circuit 41, 42 is zero i.e. no cyclic shift; and the original diversified and OFDM processed symbol is transmitted; in second branch of both cyclic delay circuits 41, 42 the cyclic delay matrices $Cd_2$ apply a cyclic shift $\delta cy_2=16$ samples; lastly, in third branches in both cyclic delay circuits 41, 42 the cyclic delay matrices $Cd_3$ apply a cyclic shift $\delta cy_3=2.\delta cy_2=32$ samples. This results in the following symbols being transmitted from the diversity transmitter 30 at times t=0 and t=1.

| | X11 | X12 | X13 | X21 | X22 | X23 |
|---|---|---|---|---|---|---|
| t = 0 | $c_1$ | $c_1 \cdot \delta cy_2$ | $c_1 \cdot \delta cy_3$ | $c_2$ | $c_2 \cdot \delta cy_2$ | $c_2 \cdot \delta cy_3$ |
| t = 1 | $-c_2{}^*$ | $-c_2{}^* \cdot \delta cy_2$ | $-c_2{}^* \cdot \delta cy_3$ | $c_1{}^*$ | $c_1{}^* \cdot \delta cy_2$ | $c_1{}^* \cdot \delta cy_3$ |

Any combination of P and M can be used. This will be explained with an example with reference to FIG. 5.

Figure 5:
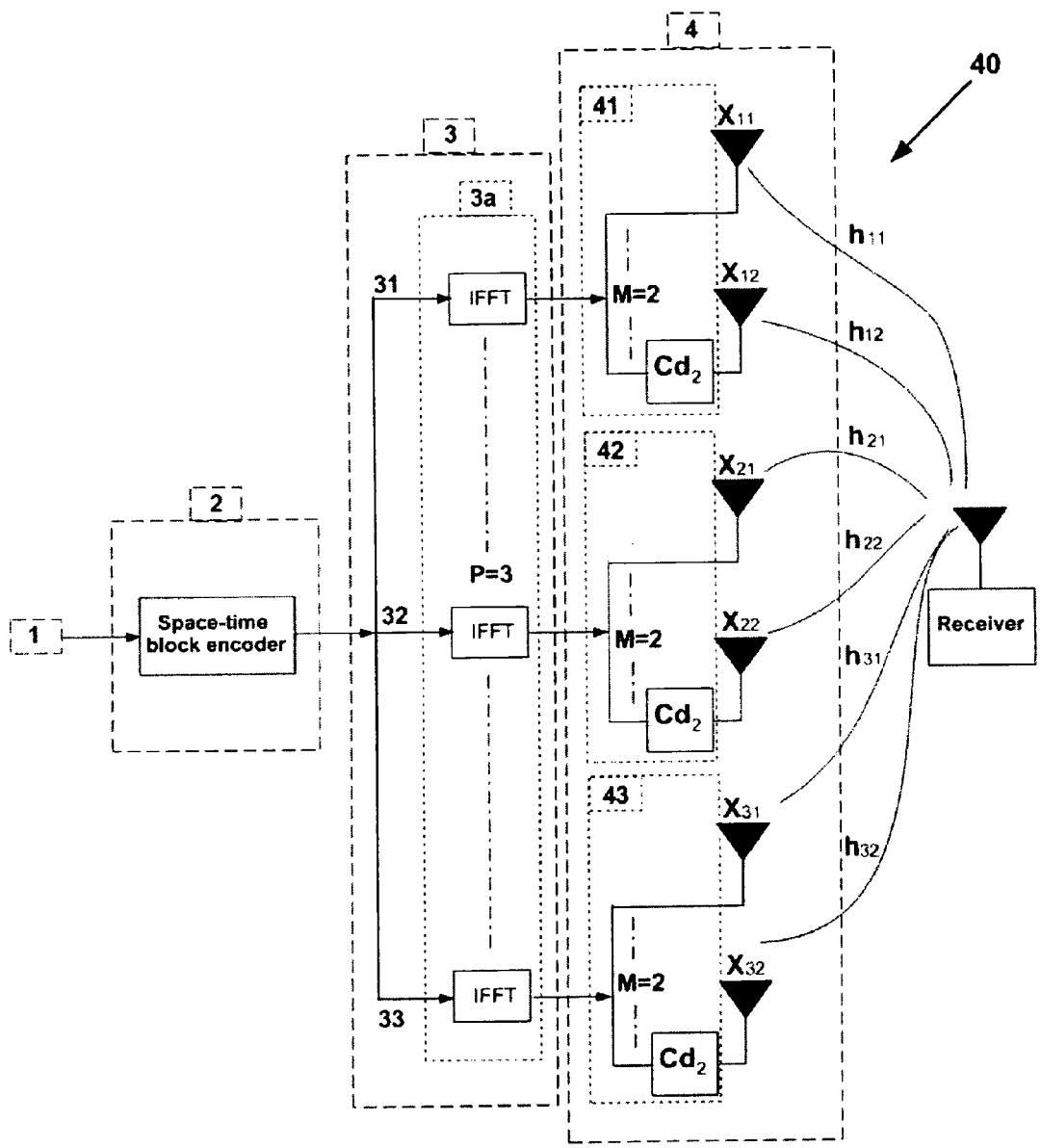
FIG. 5 is a block diagram of a fourth embodiment of diversity transmitter in accordance with the present invention.

Referring to FIG. 5 a fourth embodiment of a diversity transmitter generally identified by reference numeral 40 generally similar to diversity transmitter 30 (like reference numerals indicate like parts), comprises six spatial channels $X_{11}, X_{12}, X_{21}, X_{22}, X_{31}, X_{32}$ and a diversity generator 2 that uses sporadic or half rate STBC. In the diversity transmitter 40 the six spatial channels are provided with a combination of P=3 and M=2, rather than P=2 and M=3 of transmitter 30.

To assess the performance of the diversity transmitters 10, 20, 30 and 40, a computer simulation based on the HIPERLAN 2 Standards (see [10]) was carried out to examine Bit Error Rate (BER). The following results show BER versus SNR per bit (defined as the transmitted bit energy over the noise power spectral density ($E_b/N_0$)). A total bandwidth of 20 MHz with 64 sub-carriers and a guard period of 16 samples was used to counteract ISI. A 64 point IFFT was employed to generate each time domain OFDM symbol as described above. A half rate convolutional encoder (R=½, (133, 171)$_8$) was used for channel encoding, and a soft Viterbi decoder was used for channel decoding. Perfect channel estimation and a Maximum Ratio Combining (MRC) detection scheme was used at the receiver. All of the simulations were performed with one receive antenna. Unless otherwise stated full rate space-time block codes (based on [2]) was used as the diversity generator 2.

Figure 6:
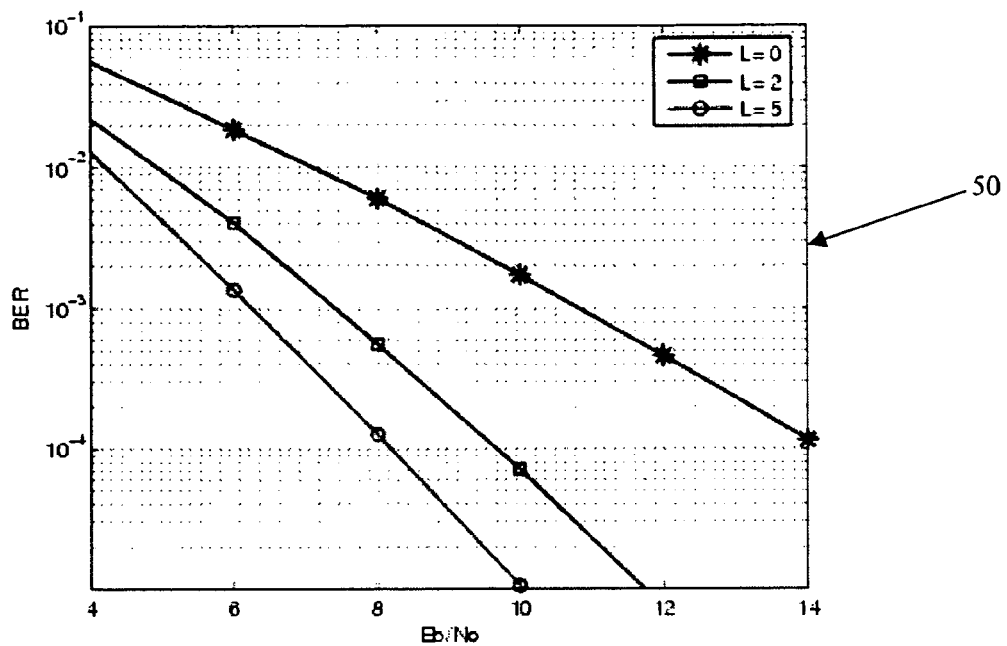
FIG. 6 is a graph of BER versus SNR per bit for a computer simulation of another diversity transmitter in accordance with the present invention.
Figure 7:
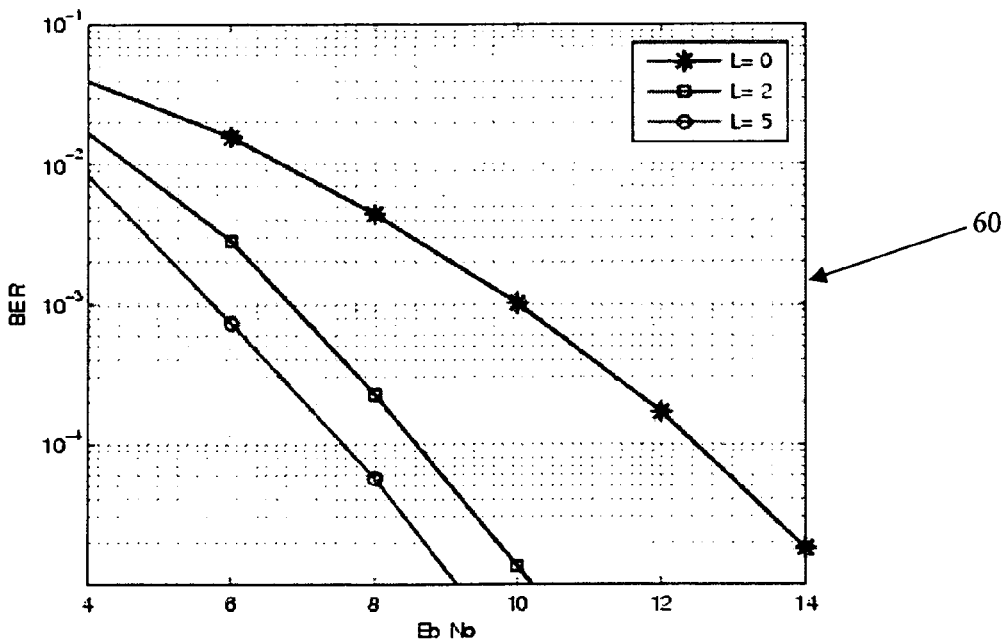
FIG. 7 is a graph of BER versus SNR per bit for a computer simulation of another diversity transmitter in accordance with the present invention.

To emphasize the importance of multipath diversity, the simulation used various transmit antenna configurations in the presence of varying channel taps. In all antenna combinations described below, only the number of branches M has been varied. Ignoring the cyclic prefix, the rate achievable with the diversity transmitters is 1 bit/s/Hz using QPSK modulation. The channel taps are independent identically distributed (i.i.d.) complex Gaussian with variance $\sigma_1{}^2=1/(L+1)$; three channel orders L=0, 2, 5 were used. Referring to FIGS. 5, 6 and 7 (the simulation results for different diversity transmitters with varying channel taps. Referring to FIG. 6 a graph 50 shows the simulation results for a diversity transmitter with three antennas two of which transmit time domain OFDM symbols with $\delta cy_1=0$ and the other with $\delta cy_2=16$. For a given $E_b/N_0$ the BER can be seen to improve with increasing channel taps; this is as expected and results from the increased multipath diversity with more channel taps. Referring to FIG. 7 a graph 60 shows the simulation results for a diversity transmitter with four antennas P=2 and M=2; one branch in each of the two cyclic delay circuits applies a cyclic delay of $\delta cy_2=16$ samples. Comparing graph 60 with graph 50 it will be seen that approximately the same BER rates can be obtained with three antennas when L=5 as with four antennas when L=2. The graph 60 supports the conclusion that addition of one more cyclic delay chain gives better performance even with less number of multipaths available in the channel.

Figure 8:
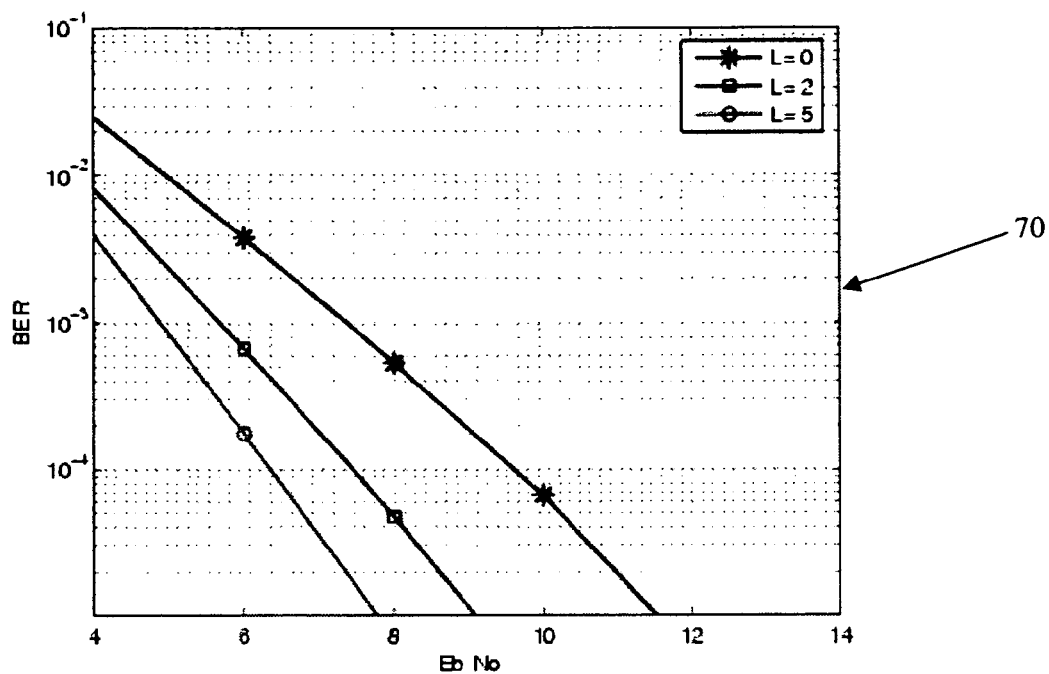
FIG. 8 is a graph of BER versus SNR per bit for a computer simulation of another diversity transmitter in accordance with the present invention.

Referring to FIG. 8 a graph 70 shows the simulation results for the diversity transmitter 40 i.e. with six antennas and P=2 and M=3. Again the further improvement in BER for a given $E_b/N_0$ is apparent. In particular comparing graph 50 with graph 70 it will be seen that approximately the same BER rates can be obtained with three antennas and L=5, as with six antennas (P=2 and M=3) when L=0 i.e. only one signal path. Accordingly, for different channel scenarios it is possible to increase the number of branches M where naturally occurring multipath is limited, without increasing complexity at the receiver.

Figure 9:
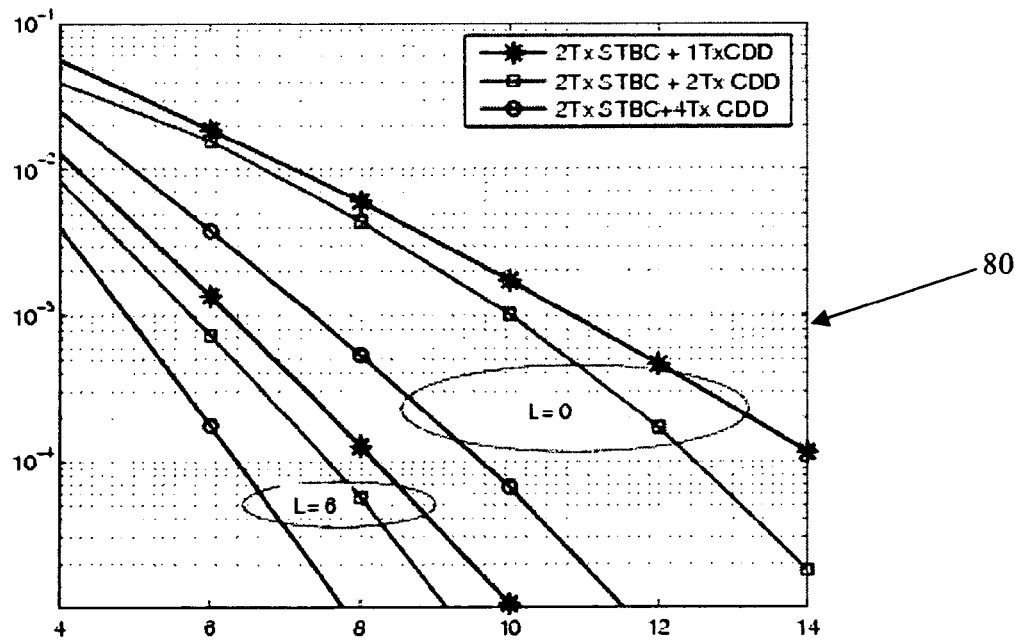
FIG. 9 is a graph of BER versus SNR per bit for a computer simulation of various diversity transmitters in accordance with the present invention at two different channel orders.

Referring to FIG. 9 a graph 80 shows the results obtained for a diversity transmitter with combinations of P and M as follows: P=2 and M=1 (three antennas in total i.e. for branch p=1, M=1 and for branch p=2, M=2); P=2 and M=2; and P=2 and M=4; all at L=0, 6 respectively. It is readily seen how increasing the number of cyclic delay branches M improves BER. This effect is yet further enhanced when the number of channel taps L (i.e. multipath) is increased.

Following the first simulation, an 18-tap Rayleigh channel model corresponding to a typical large open space environment in Non Line of Sight (NLOS) conditions was further used to compare the diversity transmission method to the following earlier proposals: (1) the space-time block encoding scheme of [3], and (2) the space-time-multipath scheme proposed in [8]. The 18-tap model has an overall and average rms delay spread of 730 ns and 100 ns respectively. The channel taps were generated using the model in Jakes [11].

Figure 10:
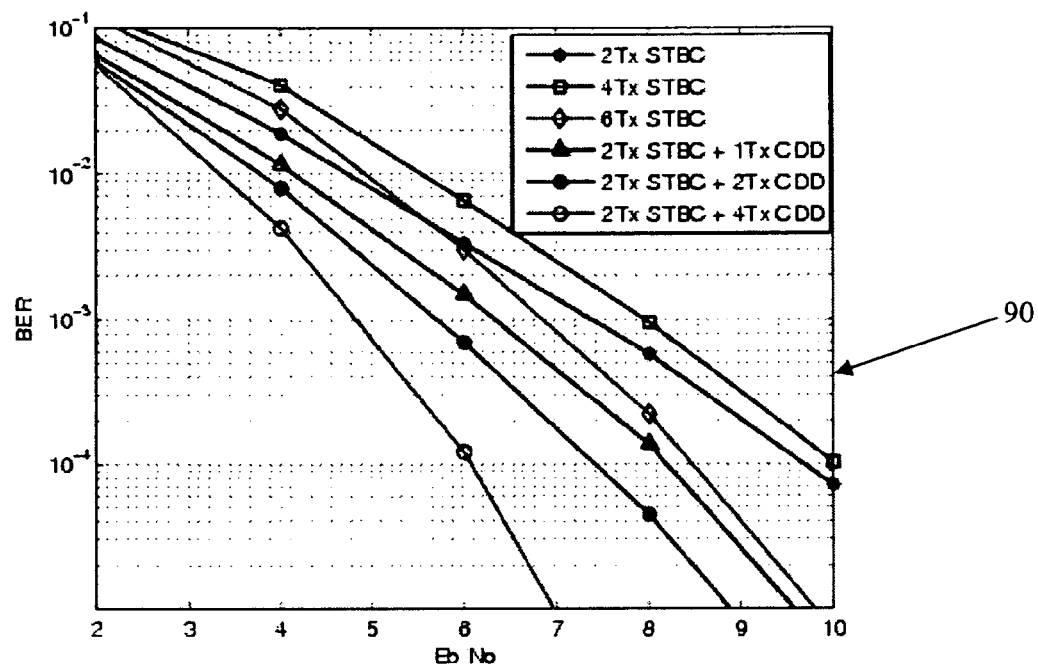
FIG. 10 is a graph of BER versus SNR per bit for a computer simulation of a diversity transmitter in accordance with the present invention and transmitter using STBC.

Referring to FIG. 10 a graph 90 shows the results of comparison (1). In particular the BER curves are plotted against $E_b/N_0$ for ST-block codes of [3] with two, four and six antennas respectively. The diversity transmitter of the present invention had the following combinations: P=2 and M=1; P=2 and M=2; and P=2 and M=4. 16-QAM was used to compensate for the rate loss as reported in [3] when four and six antennas were simulated for STBCs; for all other simulations QPSK was used. It is immediately apparent that all of the simulated diversity transmitters according to the invention outperform the best performance available with ST-block codes.

Figure 11:
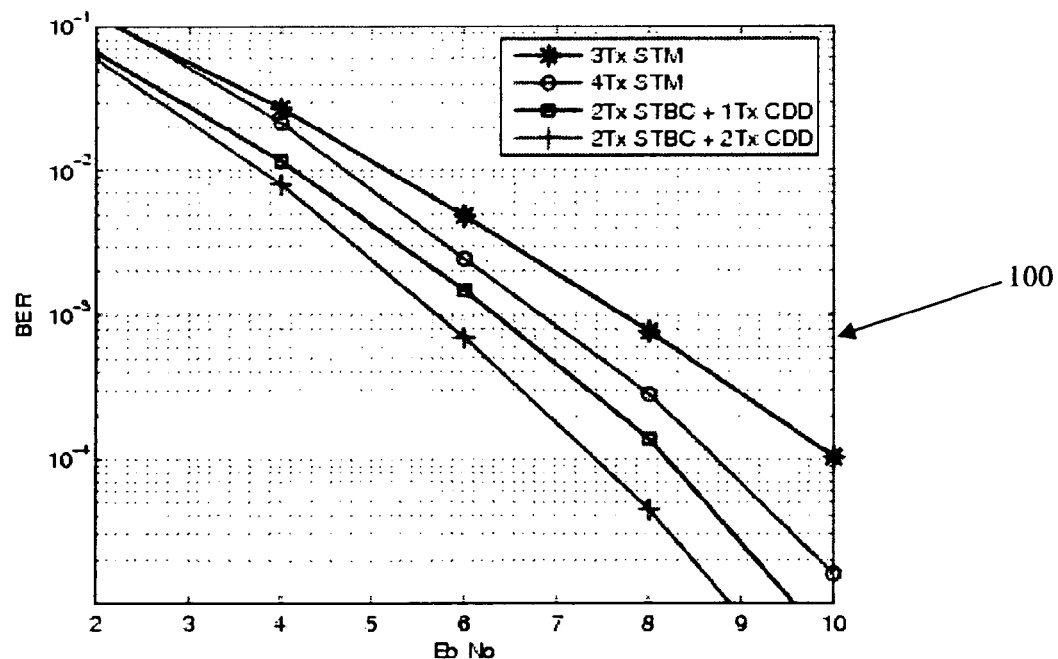
FIG. 11 is a graph of BER versus SNR per bit for a computer simulation of a diversity transmitter in accordance with the present invention and a transmitter using a space-time-multipath coding scheme.

Referring to FIG. 11 a graph 100 shows the results of comparison (2). The space-time-multipath (STM) scheme was simulated with ½ rate convolutional codes with QPSK modulation; this makes the rates of the diversity transmission method of the invention and the STM scheme the same. According to the STM scheme employing four transmit antennas requires 64 sub-carriers as the model has a delay spread of 16 samples. Therefore STM becomes sub-optimal for more than four transmit antennas. The diversity transmitter of the present invention was simulated in the following combinations: P=2 and M=1 i.e. three antennas in total (for branch p=1, M=1 and for branch p=2, M=2), and P=2 and M=2. The present invention outperforms STM scheme in both cases.

The spectral efficiency of the transmit scheme according to the present invention depends on the rate of the employed diversity generator 2. The ST-block codes for more than two diversification branches P>2 and complex signals suffer from a half or sporadic rate loss [3]. Loss in spectral efficiency makes the diversity transmitter of FIG. 4 less desirable and it is preferred that full rate STBC with any number of cyclically delayed branches are used. However, there is no limitation in using any diversity generator for better performance by trading spectral efficiency.

The diversity transmitter may be part of a mobile terminal or a base station for example, and the receiver may be a base station or another mobile terminal. Alternatively the diversity transmitter may be part of a broadcast transmitter such as a digital broadcast transmitter (e.g. DVB). Furthermore, the spatial channel may include polarization diversity channels. Some of the branches can have different cyclic delays and may provide a different quality of service and performance. There may be different channel coding, different diversity generators and even parallel transmission with necessary changes to the receiver.

The diversity generator may be adapted to subject said diversified OFDM symbol matrices to at least one of orthogonal transmit diversity (OTD), orthogonal space-time block code (STBC) processing, non-orthogonal STBC processing, space-time Trellis code (STTC) processing, or space-time turbo code processing.

Whilst the present invention is presented in terms of a comparatively simple OFDM transmission protocol, it is applicable to all OFDM based systems such as: Orthogonal Frequency Division Multiple Access (OFDMA); multi-carrier code division multiple access (MC-CDMA); MC direct-sequence CDMA (MC DS-CDMA); multitone CDMA (MT-CDMA); orthogonal MC DS-CDMA and MC DS-CDMA system with no sub-carrier overlapping, etc.

DOCUMENTS MENTIONED IN THE SPECIFICATION

[1] H. Bölcskei and A. Paulraj, "Space-frequency coded broadband OFDM systems," Wireless Commun. Networking Conf., Chicago, Ill., pp. 1-6, Sep. 23-28, 2000.

[2] S. M. Alamouti, "A simple transmit diversity technique for Wireless Communications," IEEE Journal on Selected Areas in Communications Vol. 16, pp. 1451-1458, October 1998.

[3] V. Tarokh, H. Jafarkhani and A. R. Calderbank, "Space-time block codes from orthogonal design," IEEE Transactions on Information Theory, Vol. 45, pp. 1456-1467, July 1999.

[4] V. Tarokh, N. Seshadri and A. R. Calderbank, "Space-time codes for high data rate wireless communication: Performance criterion and code construction," IEEE Transactions on Information Theory, Vol. 44, pp. 744-765, March 1998.

[5] A. Dammann and S. Kaiser, "Standard conformable antenna diversity techniques for OFDM and its application to DVB-T system," IEEE Global Telecommunications Conference (GLOBECOM 2001), pp. 3100-3105, November 2001.

[6] H. Bölcskei, M. Borgmann and A. Paulraj, "Space-frequency coded MIMO OFDM with variable multiplexing-diversity tradeoff," International Conference on Commun. (ICC), pp. 2837-2841, May 2003.

[7] Y. Xin, Z. Wang and G. Giannakis, "Space-time diversity systems based on linear constellation precoding," IEEE Trans. on Wireless Commun., vol. 2, pp. 294-309, March 2003.

[8] X. Ma and G. Giannakis, "Space-time-multipath coding using digital phase sweeping or circular delay diversity," to appear in IEEE Trans. Signal Processing, 2004.

[9] W. Su, Z. Safar, M. Olfat and K. J. Ray Liu, "Obtaining full-diversity space frequency codes from space-time codes via mapping," IEEE Trans. on Signal Processing, vol. 51, NO. 11, November 2003, pp. 2905-2916.

[10] European Telecommunications Standard Institute ETSI, "Broadband Radio Access Networks (BRAN); HIPER-LAN Type 2; Physical Layer", V1.1.1 (2000-04)

[11] W. C. Jakes "Microwave Communications", Wiley, 1974.

What is claimed is:

1. A diversity transmitter for use in an OFDM transmission protocol which diversity transmitter comprises:
    a diversity generator for receiving and diversifying OFDM transmit symbols, and outputting diversified OFDM symbol matrices (DOSM), DOSM symbols within each DOSM being divided into at least two primary streams each comprising different DOSM symbols,
    a transmit processor for receiving said at least two primary streams of DOSM symbols, and for transforming said each DOSM symbol from the frequency domain into the time domain, and outputting time domain OFDM symbols (TDOSs),
    a cyclic delay circuit for dividing at least one of said primary streams of TDOSs into at least two branches of identical TDOSs, each branch for supplying a respective spatial channel for transmission to a receiver,
    the arrangement being such that, in use, said cyclic delay circuit applies a cyclic time shift to a TDOS in at least one of said branches before transmission which cyclic time shift is performed modulo the length of said TDOS and is a multiple of a guard period of said OFDM transmission protocol.

2. A diversity transmitter as claimed in claim 1, wherein said cyclic delay circuit applies no cyclic time shift in at least one of said branches, whereby said diversity transmitter transmits substantially simultaneously from different spatial channels at least the original TDOS and a cyclically delayed replica thereof.

3. A diversity transmitter as claimed in claim 1, wherein there is a plurality of said branches, said cyclic delay circuit applying a different cyclic time shift in each branch.

4. A diversity transmitter as claimed in claim 3, wherein said cyclic time shift differs between branches by an amount sufficient to inhibit overlap between TDOSs transmitted from difference spatial channels.

5. A diversity transmitter as claimed in claim 3, wherein said cyclic time shift is such that the length of cyclic prefix or guard period is not increased.

6. A diversity transmitter as claimed in claim 1, wherein said length is measured in a number of samples of said TDOS, and said cyclic shift is performed by shifting the order of said samples.

7. A diversity transmitter as claimed in claim 1, wherein said cyclic time shift is determined according to system requirements and the number of primary streams.

8. A diversity transmitter as claimed in claim 1, wherein said cyclic time shift is dependent on the number of taps in the channel.

9. A diversity transmitter as claimed in claim 1, wherein said cyclic delay circuit comprises a cyclic delay matrix ($Cd_m$).

10. A diversity transmitter as claimed in claim 9, wherein said cyclic delay matrix ($Cd_m$) is obtainable from:

$$Cd_m = \begin{bmatrix} 0 & I_{(m-1)(L+1)} \\ I_{N-(m-1)(L+1)} & 0 \end{bmatrix}, m \in [1, M]$$

where $I_A$ is the identity matrix of order A×A, N is the number of sub-carrier frequencies in the OFDM system, M is the number of branches in that cyclic delay circuit where $Cd_m$ is to be applied, and L+1 is number of non-zero taps assumed in the channel transfer function.

11. A diversity transmitter as claimed in claim 1, further comprising a cyclic delay circuit per primary stream of TDOSs.

12. A diversity transmitter as claimed in claim 1, wherein at least one of said primary streams bypasses said cyclic delay circuit for supplying a spatial channel substantially directly, while the or each remaining primary stream delivers TDOSs to one or more cyclic delay circuit.

13. A diversity transmitter as claimed in claim 1, wherein said diversified OFDM symbol matrices are generated from a channel coded sequence.

14. A method of transmitting data in an OFDM system, which method comprises the steps of:
   (1) using a diversity generator to receive and diversify OFDM transmit symbols, and output diversified OFDM symbol matrices (DOSM);
   (2) dividing DOSM symbols within each DOSM into at least two primary streams each comprising different DOSM symbols;
   (3) transforming each DOSM symbol from the frequency domain into the time domain, and outputting time domain OFDM symbols (TDOSs);
   (4) dividing at least one of said primary streams of TDOSs into at least two branches of identical TDOSs, each branch for supplying a respective spatial channel for transmission to a receiver; and
   (5) applying a cyclic time shift to a TDOS in at least one of said branches before transmission which cyclic time shift is performed modulo the length of said TDOS and is a multiple of a guard period of said OFDM transmission protocol.

15. A method according to claim 14, further comprising the step of applying no cyclic time shift in at least one of said branches, and transmitting substantially simultaneously from different spatial channels at least the original TDOS and a cyclically delayed replica thereof.

16. A method according to claim 14, wherein there is a plurality of said branches, the method further comprising the step of applying a different cyclic time shift in each branch.

17. A method according to claim 16, wherein said cyclic time shift differs between branches by an amount sufficient to inhibit overlap between TDOSs transmitted from difference spatial channels.

18. A method according to claim 14, wherein said cyclic time shift is such that the length of cyclic prefix or guard period is not increased.

19. A method according to claim 14, wherein said length is measured in a number of samples of said TDOS, and said cyclic shift is performed by shifting the order of said samples.

20. A method according to claim 14, wherein said cyclic time shift is dependent on the number of channel taps.

21. A method according to claim 14, wherein step (5) comprises the step of applying a cyclic delay matrix ($Cd_m$) to shift said TDOS in time.

22. A method according to claim 21, wherein said cyclic delay matrix ($Cd_m$) is obtainable from:

$$Cd_m = \begin{bmatrix} 0 & I_{(m-1)(L+1)} \\ I_{N-(m-1)(L+1)} & 0 \end{bmatrix}, m \in [1, M]$$

where $I_A$ is the identity matrix of order A×A, N is the number of sub-carrier frequencies in the OFDM system, M is the number of branches in that cyclic delay circuit where $Cd_m$ is to be applied, and L+1 is number of non-zero taps assumed in the channel transfer function.

23. A method according to claim 14, further comprising the step of applying at least one cyclic delay per primary stream of TDOSs.

24. A method according to claim 14, further comprising the step of bypassing symbols in at least one of said primary streams around said cyclic delay circuit to supplying a spatial channel substantially directly, while the or each remaining primary stream delivers TDOSs to one or more cyclic delay circuit.

25. A computer readable medium comprising computer executable instructions for causing a diversity transmitter to perform the method steps of:
   (1) using a diversity generator to receive and diversify OFDM transmit symbols, and output diversified OFDM symbol matrices (DOSM);
   (2) dividing DOSM symbols within each DOSM into at least two primary streams each comprising different DOSM symbols;
   (3) transforming each DOSM symbol from the frequency domain into the time domain, and outputting time domain OFDM symbols (TDOSs);
   (4) dividing at least one of said primary streams of TDOSs into at least two branches of identical TDOSs, each branch for supplying a respective spatial channel for transmission to a receiver; and
   (5) applying a cyclic time shift to a TDOS in at least one of said branches before transmission, which cyclic time shift is performed modulo the length of said TDOS and is a multiple of a guard period of said OFDM transmission protocol.

* * * * *